United States Patent
Li et al.

(10) Patent No.: US 8,731,248 B2
(45) Date of Patent: May 20, 2014

(54) METHOD OF PERFORMING EYE CIRCLE CORRECTION AN IMAGE AND RELATED COMPUTING DEVICE

(75) Inventors: JianFeng Li, Hangzhou (CN); Jin Wang, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 309 days.

(21) Appl. No.: 13/397,690

(22) Filed: Feb. 16, 2012

(65) Prior Publication Data
US 2013/0216154 A1  Aug. 22, 2013

(51) Int. Cl.
*G06K 9/00* (2006.01)
(52) U.S. Cl.
USPC .......................... 382/117; 382/274
(58) Field of Classification Search
USPC ................................. 382/117, 274
See application file for complete search history.

(56) References Cited

U.S. PATENT DOCUMENTS

| | | | | |
|---|---|---|---|---|
| 6,571,003 B1* | 5/2003 | Hillebrand et al. | ........... | 382/118 |
| 7,039,222 B2* | 5/2006 | Simon et al. | ................... | 382/118 |
| 7,636,485 B2* | 12/2009 | Simon et al. | .................. | 382/254 |
| 8,340,417 B2* | 12/2012 | Kim | .............................. | 382/167 |
| 2006/0228040 A1* | 10/2006 | Simon et al. | ................... | 382/254 |
| 2010/0026833 A1* | 2/2010 | Ciuc et al. | .................. | 348/222.1 |
| 2013/0111337 A1* | 5/2013 | Deng et al. | .................... | 715/255 |
| 2013/0170706 A1* | 7/2013 | Mori et al. | ..................... | 382/103 |
| 2013/0329079 A1* | 12/2013 | Florea et al. | ................ | 348/222.1 |

\* cited by examiner

*Primary Examiner* — Wesley Tucker
(74) *Attorney, Agent, or Firm* — Winston Hsu; Scott Margo

(57) ABSTRACT

A method of correcting an eye circle on an image with at least one eye visible and the eye circle being located beneath the eye includes defining a core area of the image for correction, the core area being located substantially below a position of the eye in the image. The method also defines a processing area being larger in area than the core area and including the core area, and defines a surrounding area as a remaining area of the processing area not being located within the core area. An average brightness of the core area is compared to an average brightness of the surrounding area. Then a smoothing process is performed to blend the core area with the surrounding area to correct the eye circle when the average brightness of the core area is greater than that of the surrounding area by more than a first threshold.

14 Claims, 6 Drawing Sheets

METHOD OF PERFORMING EYE CIRCLE CORRECTION AN IMAGE AND RELATED COMPUTING DEVICE

BACKGROUND OF THE INVENTION

1. Field of the Invention

The invention relates to image enhancement, and more particularly, to a method of correcting an eye circle on an image containing a face with at least one eye visible on the face and the eye circle being located beneath the eye.

2. Description of the Prior Art

With the increasing popularity of computing devices, including desktop computers, notebook computers, tablet computers, and even mobile phones, users often wish to send and receive pictures to other users. For instance, a mobile phone user may wish to take a self-portrait picture with a camera of the computing device, and then share the picture with others. The picture can be shared via electronic mail (email), a video chat program, or even through social networking sites such as Facebook®.

Electronic devices such as mobile devices can greatly enrich the lives of users and bring significant convenience. For those users who love taking pictures and those who appreciate beauty, a face beautification tool that can be used on mobile devices make the mobile devices even more fun and entertaining. However, for those users who may be troubled by problems, eye circles may be visible under the eyes of the users. The eye circles generally are classified as being either dark circles under the eyes or eye bags that are caused by puffiness beneath the eyes. Eye circles can be indicative of problems such as poor sleep, work stress, and so on, and eye circles directly affect a user's appearance. As eye circles are generally considered to be undesirable, if image processing can be used to correct the appearance of eye circles in digital images, the images will look better and the users will be more likely to want to share images of themselves with others.

SUMMARY OF THE INVENTION

It is therefore one of the primary objectives of the claimed invention to provide a method and computing device for correcting eye circles on an image containing a face in order to reduce the appearance of eye circles.

According to an exemplary embodiment of the claimed invention, a method of correcting an eye circle on an image containing a face with at least one eye visible on the face and the eye circle being located beneath the eye is disclosed. The method includes loading the image into a computing device having a processor. The processor defines a core area of the image for correction, the core area being located substantially below a position of the eye in the image. The processor also defines a processing area being larger in area than the core area and including the core area, and defines a surrounding area as a remaining area of the processing area not being located within the core area. An average brightness of the core area is compared to an average brightness of the surrounding area. Then the processor performs a smoothing process to blend the core area with the surrounding area to correct the eye circle when the average brightness of the core area is greater than the average brightness of the surrounding area by an amount greater than a first threshold, and an enhanced image having the corrected eye circle is outputted.

According to another exemplary embodiment of the claimed invention, a computing device for correcting an eye circle on an image containing a face with at least one eye visible on the face and the eye circle being located beneath the eye is disclosed. The computing device includes a memory for storing the image and a processor for loading the image and selecting defining a core area of the image for correction, the core area being located substantially below a position of the eye in the image. The processor also defines a processing area being larger in area than the core area and including the core area, and defines a surrounding area as a remaining area of the processing area not being located within the core area. An average brightness of the core area is compared to an average brightness of the surrounding area. Then the processor performs a smoothing process to blend the core area with the surrounding area to correct the eye circle when the average brightness of the core area is greater than the average brightness of the surrounding area by an amount greater than a first threshold, and an enhanced image having the corrected eye circle is outputted.

It is an advantage that the present invention provides a simple and efficient method of correcting eye circles while not affecting other regions of the face. In this way, the appearance of eye circles can be reduced for improving the way images look.

These and other objectives of the present invention will no doubt become obvious to those of ordinary skill in the art after reading the following detailed description of the preferred embodiment that is illustrated in the various figures and drawings.

DETAILED DESCRIPTION

The present invention focuses on facial image quality, and especially on improving people's appearances. The present invention uses a method of intelligent image enhancement for digital images to improve or even eliminate eye circles from digital images to improve the overall appearance of the images. Conveniently, the method can be operated in a fully automatic manner without any user involvement. Of course, if the user has particular demands for the software to perform, the method can accommodate the user's demands. Furthermore, the present invention method reduces the appearance of eye circles to produce an enhanced image while attempting to leave no evidence of the enhanced image having undergone image processing. Furthermore, the present invention method can be processed quickly and efficiently, and common modern mobile devices with minimal computing power can execute the image enhancement method.

Figure 1:
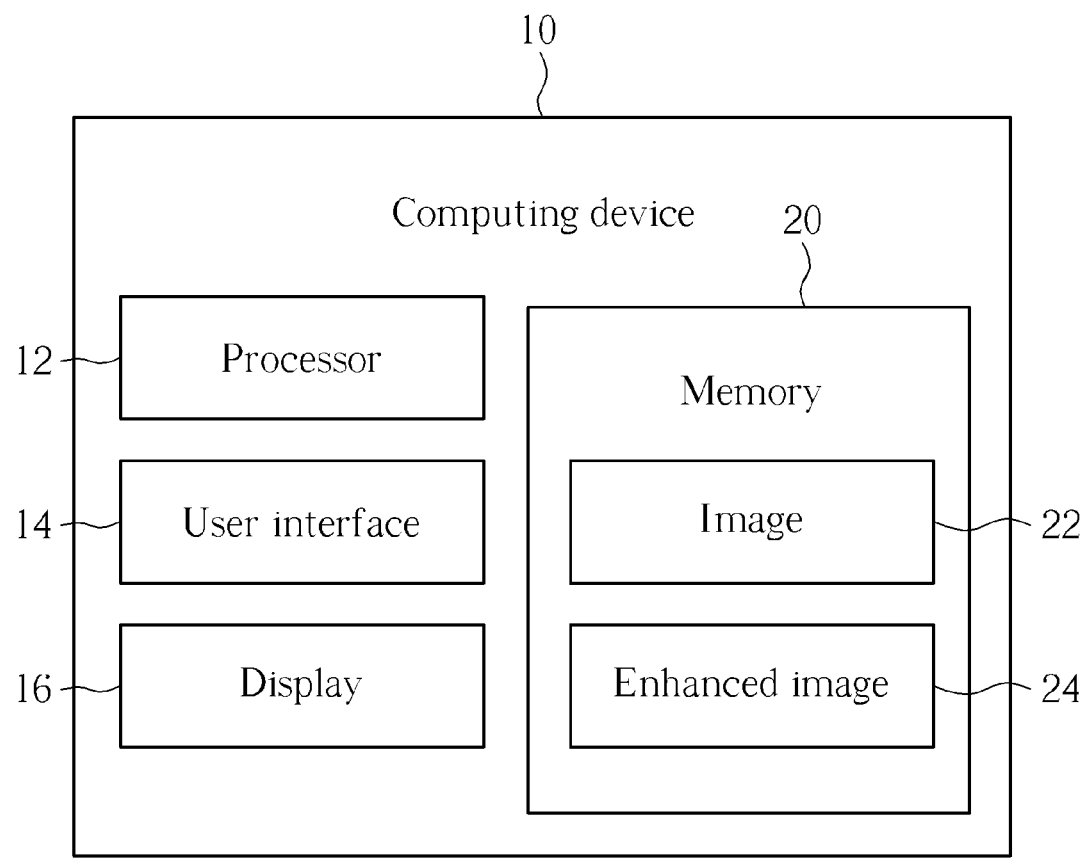
FIG. 1 is a functional block diagram of a computing device according to the present invention.

Please refer to FIG. 1. FIG. 1 is a functional block diagram of a computing device 10 according to the present invention. The computing device 10 contains a processor 12 for controlling operation of the computing device 10 and for executing commands for the computing device 10, a user interface 14 for enabling a user to use the computing device 10, a display 16 for displaying images, and a memory 20. The memory can store at least one image 22 and at least one enhanced image 24. The processor 12 can execute image enhancing processes in order to convert the image 22 into the enhanced image 24.

Figure 2:
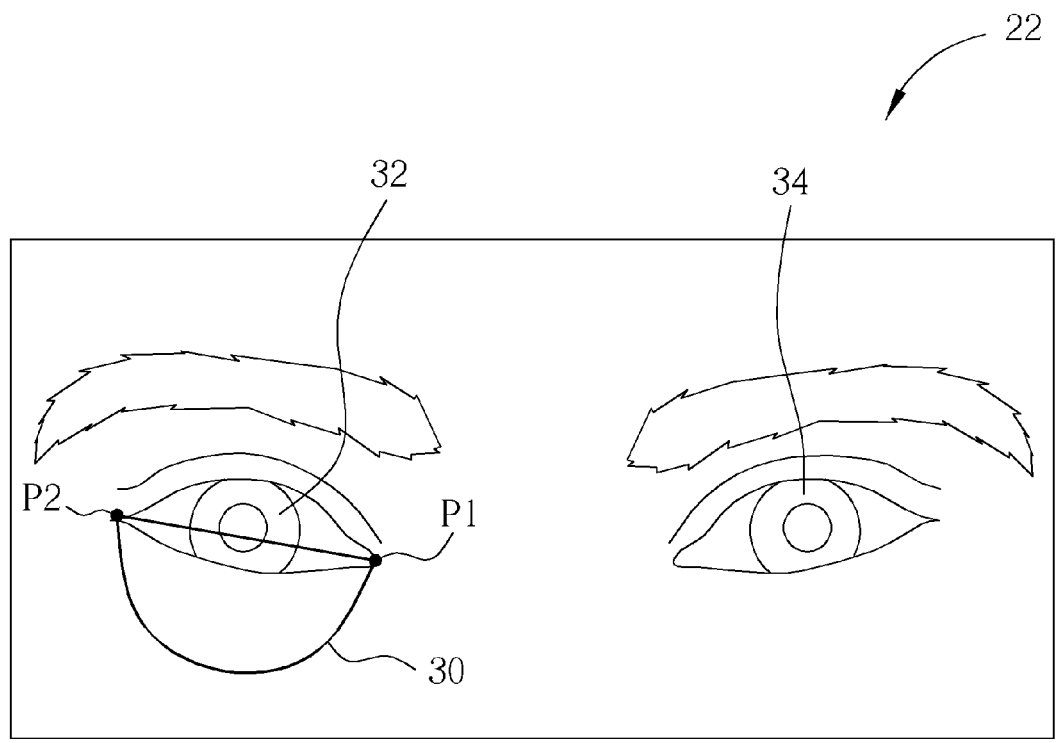
FIG. 2 illustrates an image containing a face with eyes visible on the face.

Please refer to FIG. 2. FIG. 2 illustrates the image 22 containing a face with eyes 32 and 34 visible on the face. The eyes 32 and 34 shown in the image 22 are the original eyes contained in a photograph that was saved as the image 22. Although most images show two eyes, the following discussion will focus on only the eye 32 for brevity. The method for correcting eye circles under two eyes applies the same principles as the method for correcting an eye circle under a single eye.

Two feature points P1 and P2 are drawn at corners of the eye 32. Then, using the two feature points P1 and P2, a semi-circle 30 is drawn such that the feature points P1 and P2 are located at opposite ends of a diameter of the semi-circle 30, with the semi-circle 30 being located below the diameter of the semi-circle 30. The semi-circle 30 represents an approximate area in which an eye circle would be located underneath the eye 32, although the eye circle may be larger or smaller than the semi-circle 30. The eye circle is generally classified as being either a dark circle under the eye 32 or an eye bag that are caused by puffiness beneath the eye 32.

Although the eye circle will generally be confined to a fixed location under the eye 32, due to individual differences of users as well as varying conditions or angles of different images, some adjustments will be needed. In order to suppress the effect of these different factors, especially in dealing with the adverse impact of the varying locations, the corners of the eye 32 represented by the feature points P1 and P2 are used for providing information used in the follow-up processes. Predetermined masks can be used in conjunction with the location information provided by the feature points P1 and P2 to locate the eye circle. Furthermore, the eye circle correction method is robust and flexible enough so that the eye circle can be treated without knowing a precise location of the eye circle ahead of time.

Figure 3:
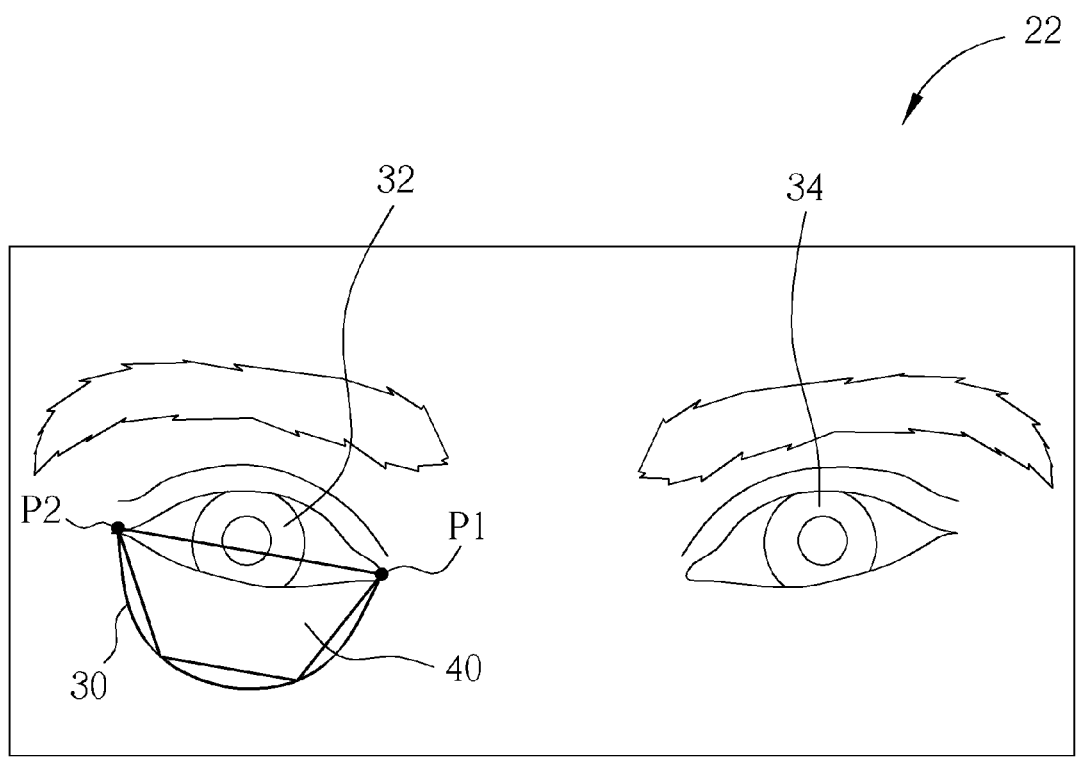
FIG. 3 illustrates the image having a core area represented by a quadrilateral inscribed in a semi-circle.

Please refer to FIG. 3. FIG. 3 illustrates the image 22 having a core area 40 represented by a quadrilateral inscribed in the semi-circle 30. The core area 40, like the semi-circle 30, represents an approximate area in which an eye circle would be located underneath the eye 32. Please note that the core area 40 could also be represented by other polygons instead of a quadrilateral.

Figure 4:
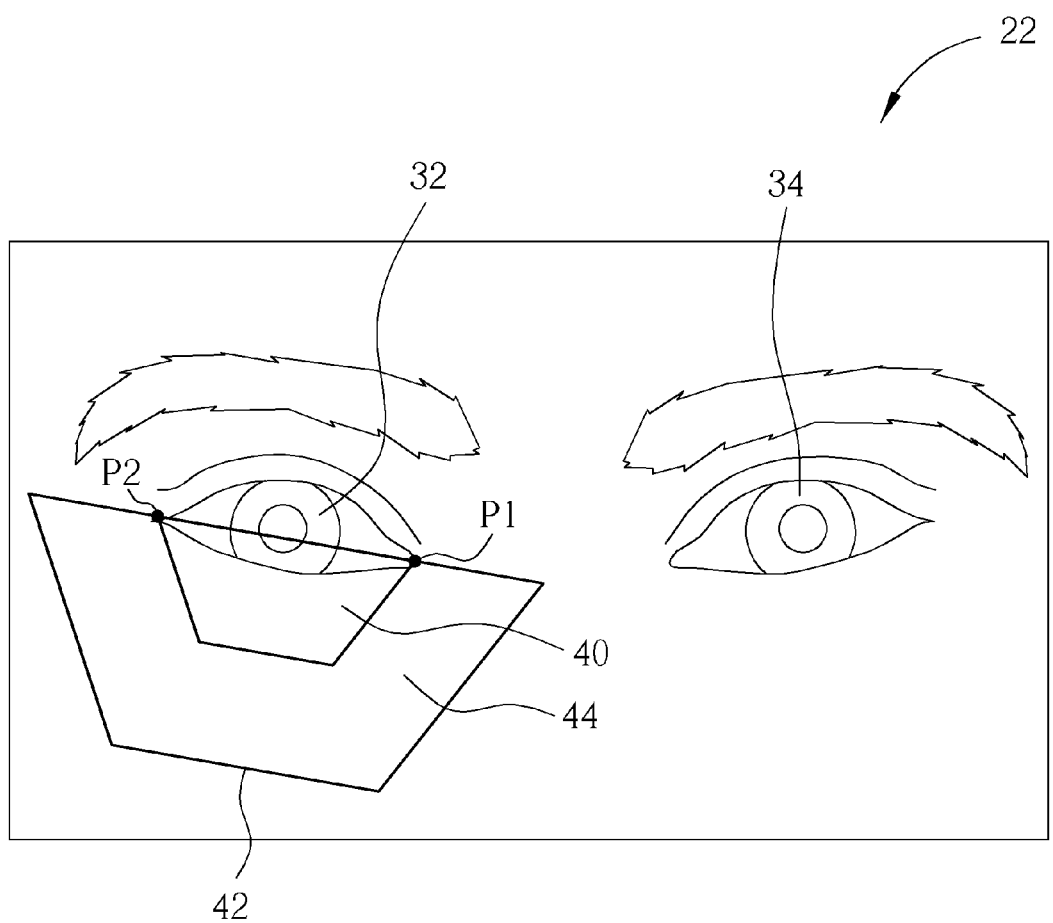
FIG. 4 illustrates the image with a processing area drawn surrounding the core area.

Please refer to FIG. 4. FIG. 4 illustrates the image 22 with a processing area 42 drawn surrounding the core area 40. The processing area 42 includes the core area 40, and the length and width of the processing area 42 are approximately twice that of the core area 40. The remaining area of the processing area 42 that is not included in the core area 40 is referred to as the surrounding area 44. In effect, the surrounding area 44 surrounds the lower portion of the core area 40, and the core area 40 and the surrounding area 44 are compared with one another for performing image processing on the processing area 42.

Figure 5:
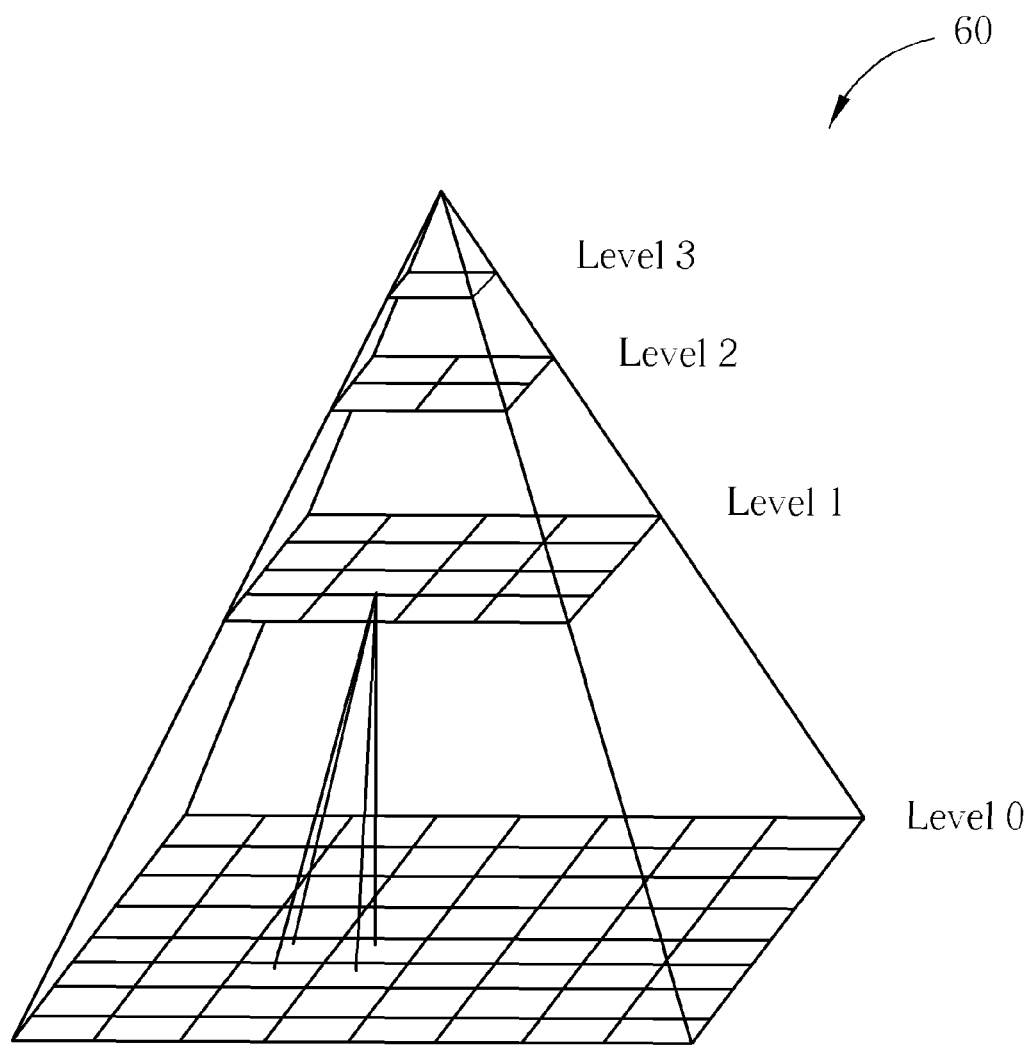
FIG. 5 shows a pyramid representing a multi-scale image processing approach.

Due to the complex form of an eye circle, it is necessary to consider the eye circle on different scales and use different correction strategies. Therefore, multi-scale analysis and processing is carried out in the present invention. Please refer to FIG. 5. FIG. 5 shows a pyramid 60 representing a multi-scale image processing approach. The pyramid 60 contains levels 0, 1, 2, and 3. Level 3 corresponds to a broader analysis providing a rough outline of the image 22 and includes fewer details. On the other hand, level 0 corresponds to a fine analysis of the image 22, and contains a high number of details. Levels 1 and 2 have a number of details between that of level 0 and level 3.

The pyramid 60 multi-scale analysis is simple and quick, and provides different specific levels of analysis. Image signals are analyzed at each level of the pyramid 60 to determine what is affecting the visual appearance. In this way, the multi-scale analysis is used to quantify the results of the eye circle area analysis in preparation for subsequent processing.

For different kinds of eye circles such as eye bags and dark circles, the same multi-scale framework can be used to treat these different conditions. Based on the results of the analysis section, the appropriate correction techniques will be used to improve the brightness of the eye circles, suppress some undesirable skin textures, and reduce the overall appearance of eye circles.

Figure 6:
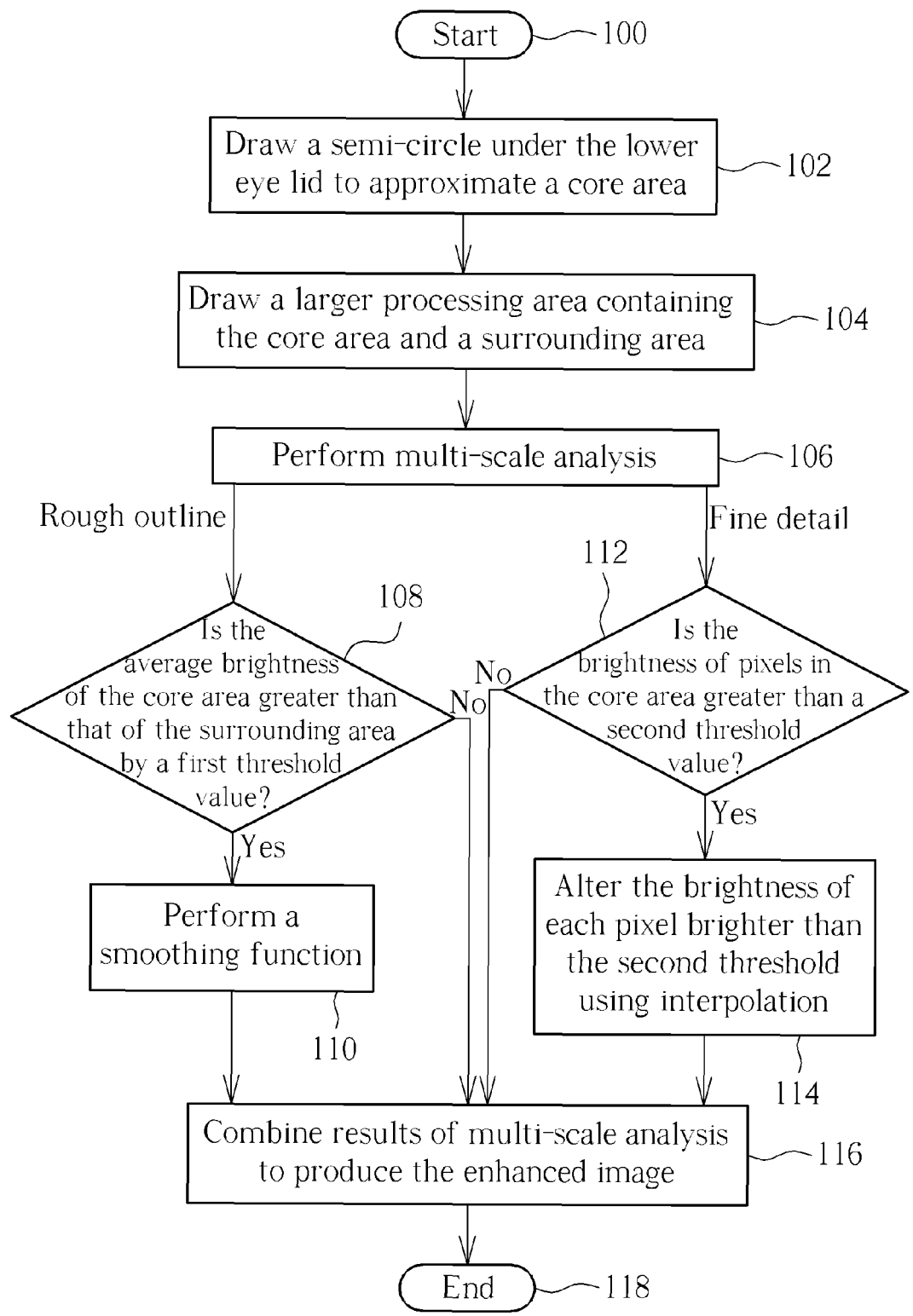
FIG. 6 is a flowchart describing the method of correcting the eye circle according to the present invention.

Please refer to FIG. 6. FIG. 6 is a flowchart describing the method of correcting the eye circle according to the present invention. Steps in the flowchart will be explained as follows.

Step 100: Start.

Step 102: According to the feature points P1 and P2 corresponding to the corners of the eye 32, draw a semi-circle 30 under the lower eye lid of the eye 32 for representing a general location of the core area 40.

Step 104: A quadrilateral is drawn in the location of the semi-circle 30 for approximating the location of the semi-circle 30. The quadrilateral represents the core area 40. Both the length and width of the quadrilateral are doubled for obtaining the processing area 42 that includes both the core area 40 and the surrounding area 44.

Step 106: The processing area 42 then undergoes multi-scale analysis for analyzing a rough outline of the image 22 corresponding to level 3 of the pyramid 60, a fine analysis of the image corresponding to level 0 of the pyramid 60, and in-between levels of analysis corresponding to levels 1 and 2 of the pyramid 60. After executing step 106, the flowchart can simultaneously execute steps 108 and 112. Alternatively steps 108 and 112 can be executed one after the other.

Step 108: Perform a rough outline analysis. Determine if the average brightness of the core area 40 is greater than an average brightness of the surrounding area 44 by an amount greater than a first threshold value. If so, go to step 110. Otherwise, go to step 116. When the average brightness of the core area 40 is greater than the average brightness of the surrounding area 44 by an amount greater than the first threshold value, this means that the core area 40 is either too dark or too bright. If the core area 40 is too dark, it means the eye circle under the eye is a dark circle. If the core area 40 is too bright, it means the eye circle under the eye is an eye bag caused by swelling and illuminated by bright light.

Step 110: Based on the brightness difference between the core area 40 and the surrounding area 44, a smoothing function is performed to make the brightness difference smaller and less noticeable. The smoothing function can be a Gaussian blur process, also known as a Gaussian smoothing process. The flowchart then proceeds to step 116.

Step 112: Perform a fine detail analysis. For each pixel of the core area 40, determine if an absolute value of the brightness of that pixel is greater than a second threshold value. If so, go to step 114. Otherwise, go to step 116.

Step 114: Alter the brightness of each pixel that has an absolute value of its brightness being greater than the second threshold value in order to provide the pixel with a new brightness. The new brightness of the pixel is calculated through an interpolation process using brightness values of surrounding pixels.

Step 116: The results of all levels of the multi-scale analysis are combined to give a final result and to produce the enhanced image 24.

Step 118: End.

The present invention can be implemented in any kind of computing device 10 such as a desktop computer, a notebook computer, a tablet computer, and a personal digital assistant (PDA), and a mobile phone. Any computing device 10 that has a memory for storing images and a processor for executing the image enhancement process can be used with the present invention enhancement method. Furthermore, the present invention can enhance not only images obtained from photographs, but also can enhance computer generated images.

In summary, the present invention provides a simple and efficient method of correcting eye circles while not affecting other regions of the face. In this way, the appearance of eye circles can be reduced for improving the way images look. The method is also computationally light enough to be implemented on a common mobile device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting an eye circle on an image containing a face with at least one eye visible on the face and the eye circle being located beneath the eye, the method comprising:
    loading the image into a computing device having a processor, the processor executing the following steps:
        defining a core area of the image for correction, the core area being located substantially below a position of the eye in the image;
        defining a processing area being larger in area than the core area and including the core area, and defining a surrounding area as a remaining area of the processing area not being located within the core area;
        comparing an average brightness of the core area to an average brightness of the surrounding area;
        performing a smoothing process to blend the core area with the surrounding area to correct the eye circle when the average brightness of the core area is greater than the average brightness of the surrounding area by an amount greater than a first threshold; and
        outputting an enhanced image having the corrected eye circle.

2. The method of claim 1 further comprising:
    comparing a brightness of each pixel located within the core area with a second threshold; and
    altering the brightness of each pixel to become a new brightness, the new brightness being calculated through an interpolation process using brightness values of surrounding pixels.

3. The method of claim 1, wherein the core area is located below a position of two eye corners of the eye.

4. The method of claim 3, wherein the core area is modeled as being a semi-circle, with the points corresponding to the two eye corners being located at opposite ends of a diameter of the semi-circle, and an area of the semi-circle being located below the diameter of the semi-circle.

5. The method of claim 3, wherein the core area is modeled as being a quadrilateral inscribed in a semi-circle, with the points corresponding to the two eye corners being located at opposite ends of a diameter of the semi-circle, and an area of the semi-circle being located below the diameter of the semi-circle.

6. The method of claim 5, wherein the processing area has an area approximately twice as large as an area of the core area.

7. The method of claim 1, wherein the smoothing process is a Gaussian blur process.

8. A computing device for correcting an eye circle on an image containing a face with at least one eye visible on the face and the eye circle being located beneath the eye, the computing device comprising:
    a memory for storing the image; and
    a processor for loading the image and executing the following steps:
        defining a core area of the image for correction, the core area being located substantially below a position of the eye in the image;
        defining a processing area being larger in area than the core area and including the core area, and defining a surrounding area as a remaining area of the processing area not being located within the core area;
        comparing an average brightness of the core area to an average brightness of the surrounding area;
        performing a smoothing process to blend the core area with the surrounding area to correct the eye circle when the average brightness of the core area is greater than the average brightness of the surrounding area by an amount greater than a first threshold; and
        outputting an enhanced image having the corrected eye circle.

9. The computing device of claim 8 further comprising:
    comparing a brightness of each pixel located within the core area with a second threshold; and
    altering the brightness of each pixel to become a new brightness, the new brightness being calculated through an interpolation process using brightness values of surrounding pixels.

10. The computing device of claim 8, wherein the core area is located below a position of two eye corners of the eye.

11. The computing device of claim 10, wherein the core area is modeled as being a semi-circle, with the points corresponding to the two eye corners being located at opposite ends of a diameter of the semi-circle, and an area of the semi-circle being located below the diameter of the semi-circle.

12. The computing device of claim 10, wherein the core area is modeled as being a quadrilateral inscribed in a semi-circle, with the points corresponding to the two eye corners being located at opposite ends of a diameter of the semi-circle, and an area of the semi-circle being located below the diameter of the semi-circle.

13. The computing device of claim 12, wherein the processing area has an area approximately twice as large as an area of the core area.

14. The computing device of claim 8, wherein the smoothing process is a Gaussian blur process.

* * * * *